Aug. 24, 1943.   L. P. TIERS   2,327,943
PROCESS OF DRYING CORNSTARCH AND SIMILAR MATERIALS
Filed March 10, 1939
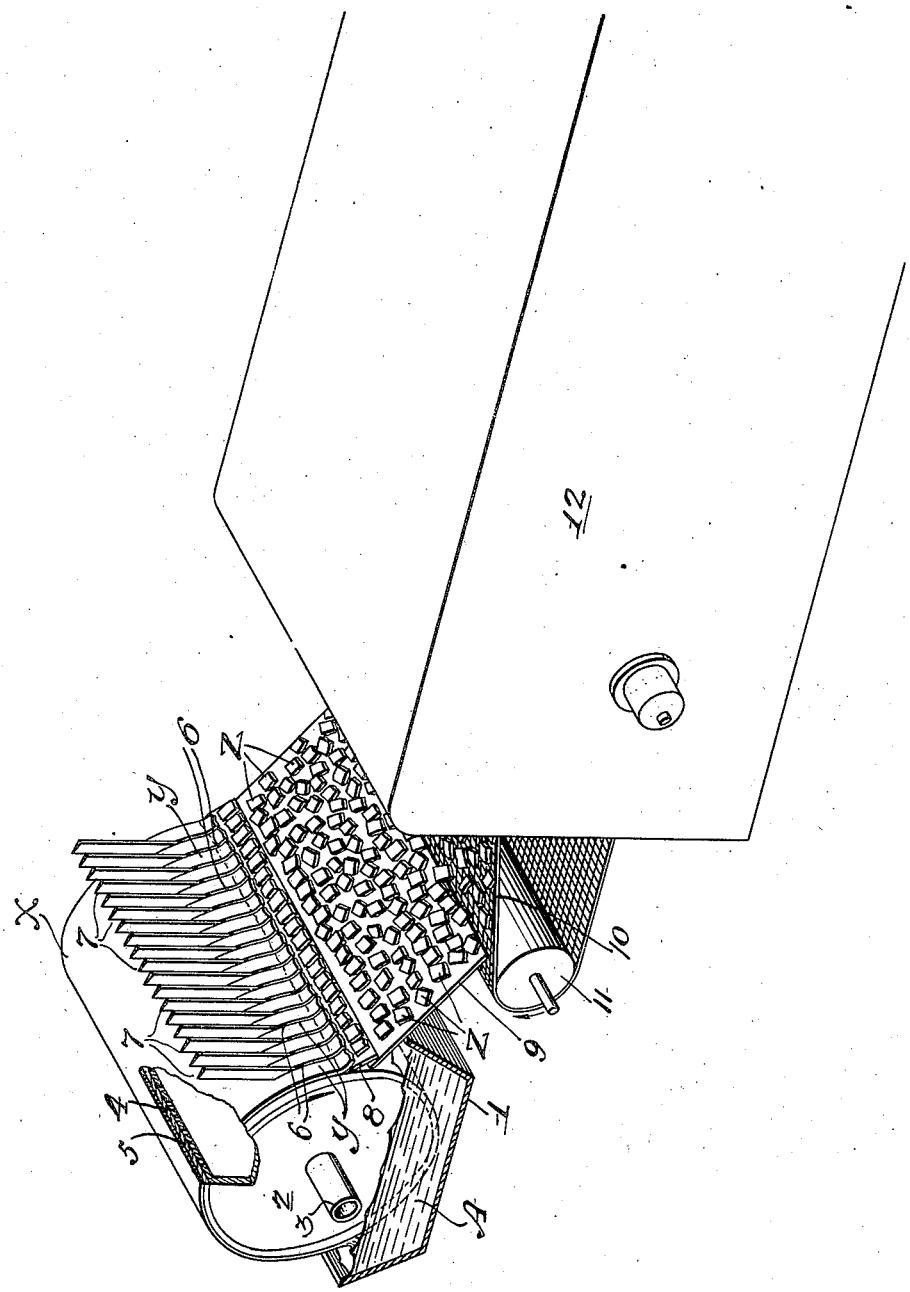
Inventor
Louis P. Tiers
by his Attorneys
Howson & Howson Patented Aug. 24, 1943

2,327,943

UNITED STATES PATENT OFFICE 2,327,943

PROCESS OF DRYING CORNSTARCH AND SIMILAR MATERIALS

Louis P. Tiers, Wilmette, Ill., assignor to Proctor & Schwartz, Incorporated, Philadelphia, Pa., a corporation of Pennsylvania Application March 10, 1939, Serial No. 261,095

5 Claims. (Cl. 127—71)

This invention relates to the drying of starch and other products having characteristics similar to those of starch. The present application is a companion to the copending application of Alpheus O. Hurxthal, Serial No. 263,972, filed March 24, 1939. Starch, in a finely divided state may be suspended in and by a suitable treating liquid and the liquid may be subsequently extracted therefrom by filtration, leaving the material in a penetrable layer on the surface of the filter which will normally harden rapidly under normal atmospheric conditions.

It has been known, heretofore, to extract the liquid constituent of an aqueous bulk of refined starch from the solid constituent composed of the finely divided particles of starch, by use of a rotary filter comprising a perforated drum coupled to a suitable evacuator for the liquid and provided with a felt or other suitable filter blanket encasing the drum and on which the solid particles of starch build up in a layer of considerable thickness, as the drum revolves with the lower portion thereof submerged to a desirable depth in the aqueous bulk containing the suspended particles of starch; and to scrape the more or less solidified layer of starch subsequently from the outer surface of the filter blanket by a doctor blade extending across and making contact with the full width thereof. The material thus removed from the filter drum has been placed in trays which were loaded on trucks and the trucks moved intermittently through long drying tunnels, wherein air was circulated to effect evaporation of the excess moisture from the starch.

Refined starch, being a highly hygroscopic substance, normally contains about 12 to 15% moisture, or an amount substantially equal to that contained in the air in which the starch is placed. If dried beyond this point the starch will inherently absorb moisture until its moisture content balances the moisture content of the surrounding atmosphere. Therefore, the above reference to evaporation of excess moisture from the starch denotes extraction to a percentage substantially equal to the moisture content of the surrounding atmosphere which might range from zero, in completely dry air, to a normal percentage of from 12 to 15% as noted above.

Removal of the filtered starch, which is normally in the form of a layer from ⅜ to ½ inch in thickness, from the drum by the doctor blade, results in the starch being broken up into pieces of extremely irregular sizes and shapes varying from free finely divided particles to sheets of several square inches in area. Such circumstances are not conducive to economical drying, as the finely divided particles and smaller pieces in a given length of drying time, under predetermined conditions, will become dried to an extent below the normal moisture content of the atmosphere into which the starch will pass from the drier. The starch necessarily will subsequently reabsorb a balancing amount of moisture, while the larger pieces and sheets of starch are attaining the proper degree of moisture loss, i. e. extraction of the excess moisture. Thus, the drying time and conditions must be regulated to take care of the proper degree of moisture extraction from the largest of the pieces which might be removed from the filter and placed in the trays.

To overcome the above conditions, and thereby produce a more economical process, the starch coming from the filter has been reduced to a small granular state prior to ultimate drying. Such a process, in overcoming one undesirable condition created a far worse condition, in that reducing the starch to granular form produced an excessive amount of loose fine particles which were scattered by the drying air and lost and in addition created a major hazard to life and property because the fine starch particles when mixed with air produce a very dangerous explosive.

Furthermore, the fine particles clogged the perforations in the bottoms of the trays and prevented the drying air from passing vertically through the material in the tray, thus retarding drying and disrupting the uniformity of drying for which the reduction of the starch to granular form was primarily introduced.

The present invention is directed to the elimination of the foregoing undesirable conditions and hazards and to this end the present invention contemplates the reduction of the wide layer of filtered starch on the filter drum to a multiplicity of ribbons of substantially uniform widths before the material is scraped from the drum by the doctor blade, whereby the ribbons will break up into pieces of approximately uniform dimensions and the production of fines normally caused by the breaking up of the starch by the doctor blade in scraping the starch from the filter drum is reduced to a minimum; and whereby the drying of the uniform units may be readily controlled to reduce the excess moisture to the proper degree without overdrying any of the product, by which the drying of the bulk is rendered more economical.

In practicing the present invention, reference being had to the single figure of the accompanying drawing which diagrammatically illustrates an apparatus capable of use with the process, the starch or similar material reduced to fine particles suspended in water or other suitable liquid, indicated at A, is placed in a suitable vat or pan 1, having an open top through which the lower portion of a suitable filter drum 2 extends to proper depth in the solution A. The drum 2 is mounted for rotation in this position and, as usual in this type of apparatus, is provided with a perforated peripheral surface having the perforations communicating with the hollow interior of the drum from which air and liquid are evacuated by any suitable form of evacuator through, for example, the supporting trunnions at one or the other or both ends of the drum, for which purpose the trunnions are made hollow, as shown.

The perforated shell 4, forming the peripheral surface of the drum 2, is normally encased in a felt sleeve, blanket or other filter material 5 which will permit the liquid constituent of the solution A to pass through to the interior of the drum 2 but which will arrest the passage of the solid particles in suspension in the liquid and cause them to build up into a layer $x$ of substantially uniform thickness on the periphery of the drum.

While the layer $x$ is still in a more or less penetrable state it is scored circumferentially of the drum as indicated at 6, 6, substantially through to the underlying filter blanket or jacket 5, by laterally spaced scoring blades or needles 7, 7, which divide the sheet or layer $x$ into a plurality of ribbons $y$, $y$, of uniform relatively narrow widths.

The ribbons $y$, $y$ are subsequently engaged by a doctor blade 8, as the drum 2 rotates in the direction of the arrow thereon. The doctor blade breaks the advancing ends of the ribbons $y$, $y$ off the supporting surface of the filter blanket 5 cleanly into pieces or units of substantially uniform lengths corresponding approximately to the widths of the ribbons, whereby the sheet $x$ is reduced to more or less regular squares or rectangles $z$, $z$ of substantially uniform thickness and approximately uniform areas, which avoids the formation of fines to any appreciable extent.

The units $z$, $z$ pass off the doctor blade 8, by gravity, onto an inclined chute 9 which is disposed with its discharge end slightly above an upper run 10 of an endless foraminous belt conveyer which passes around a drum 11 and enters one end of a drying chamber 12. The foraminous belt 10 carries the units $z$, $z$, through the chamber 12 wherein the units $z$, $z$, lying on the upper run of the foraminous conveyer are subjected to the moisture evaporating influence of currents of air or other suitable gaseous fluid circulated around the units $z$, $z$ and through the openings of the conveyer, the units $z$, $z$ being ultimately discharged from the conveyer 10 at the opposite end of the chamber 12 in a properly dried condition.

I claim:

1. The process of drying starch and other substances of like characteristics, which consists in filtering out finely divided particles of the substance from suspension in a liquid to form a penetrable sheet like mass thereof, scoring the sheet to divide it into a series of ribbons, breaking the ribbons into units of approximately uniform lengths after said scoring, and spreading the units to dry in the presence of a gaseous medium for evaporating excess moisture therefrom.

2. The process of drying starch and other substances of like characteristics wherein finely divided particles of the substance are suspended in a liquid, filtering out said fine particles in the form of a penetrable sheet-like mass on a rotating filter surface, scoring the penetrable sheet while on said filter surface to divide it into a series of ribbons, breaking the ribbons into units of approximately uniform lengths, and spreading the units to dry in the presence of a gaseous medium for evaporating excess moisture therefrom.

3. The process of drying starch and other substances of like characteristics wherein finely divided particles of the substance are suspended in a liquid, filtering out said fine particles on a rotating filter surface in the form of a penetrable sheet-like mass, scoring the penetrable sheet while on the filter surface to divide it into a series of ribbons, scraping the scored sheet off the filter surface and thereby breaking the ribbons into units of approximately uniform lengths, and spreading the units to dry in the presence of a gaseous medium for evaporating excess moisture therefrom.

4. The process of drying starch and other substances of like characteristics wherein finely divided particles of the substance are suspended in a liquid, filtering out said fine particles on a rotating filter surface in the form of a penetrable sheet-like mass, scoring the penetrable sheet while on the filter surface to divide it into a series of ribbons, scraping the scored sheet off the filter surface and thereby breaking the ribbons into units of approximately uniform lengths, and spreading the units to dry on a foraminous support moving into and through a drying chamber in the presence of a gaseous medium for evaporating excess moisture therefrom.

5. The process of drying starch wherein finely divided particles of the starch are suspended in a liquid, filtering out said fine particles on a moving filter surface in the form of a penetrable sheet-like mass, scoring the sheet while on the filter surface to divide it into a series of ribbons, removing the scored sheet from the filter surface while breaking the ribbons into units of approximately uniform lengths, and spreading the units to dry on a foraminous support moving into and through a drying chamber in the presence of heated air for evaporating excess moisture therefrom.

LOUIS P. TIERS.